S. H. YANCEY.
SHOCK ABSORBER.
APPLICATION FILED FEB. 16, 1912.
1,058,834.
Patented Apr. 15, 1913.
3 SHEETS—SHEET 2.
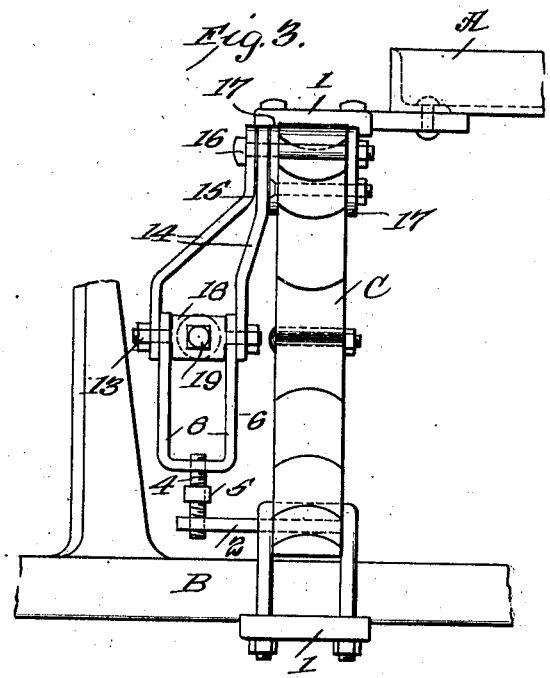
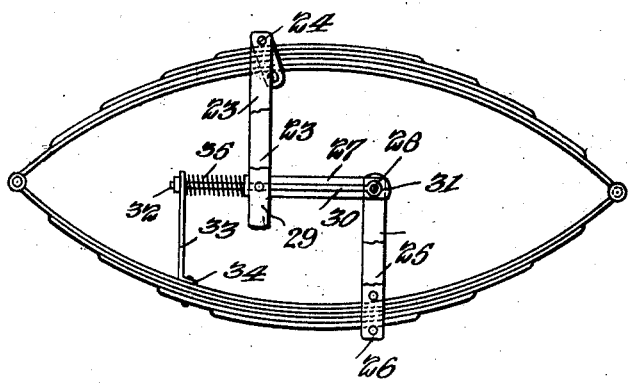
Witnesses
E. M. Callaghan
R. B. Cavanagh
Inventor
SAMUEL H. YANCEY,
By Victor J. Evans
Attorney

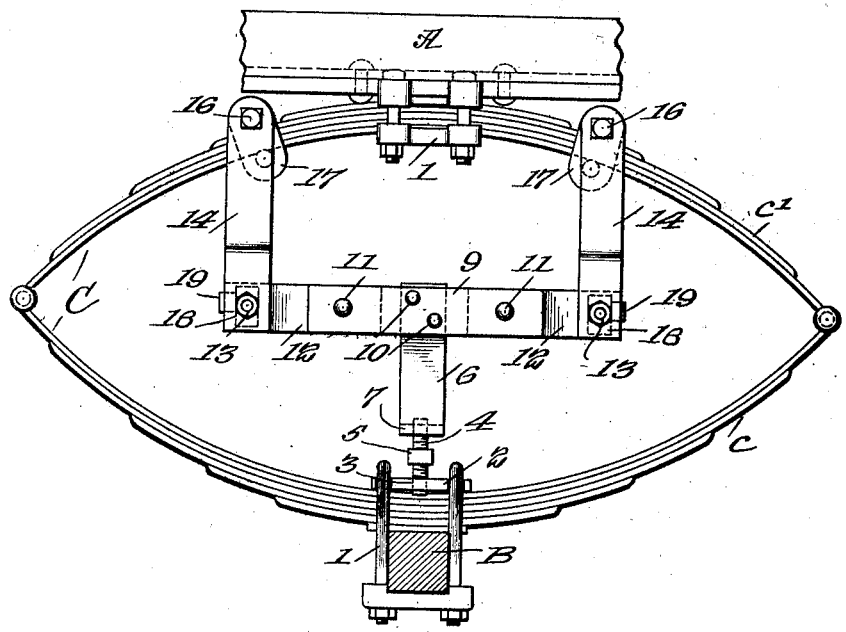
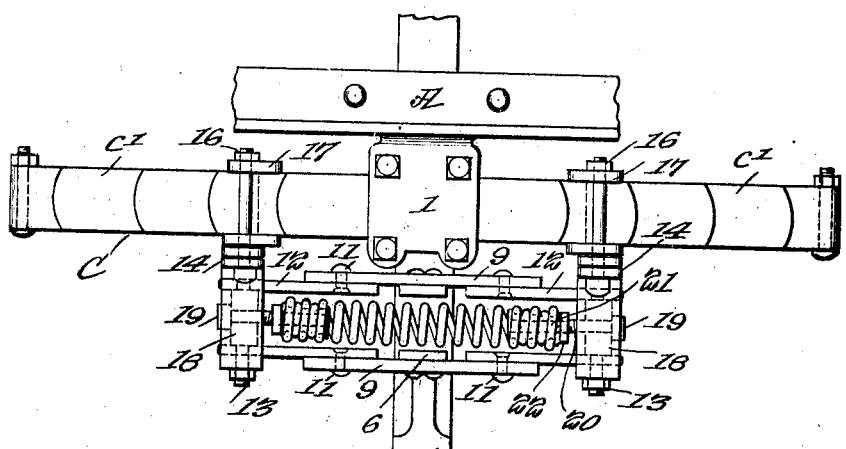

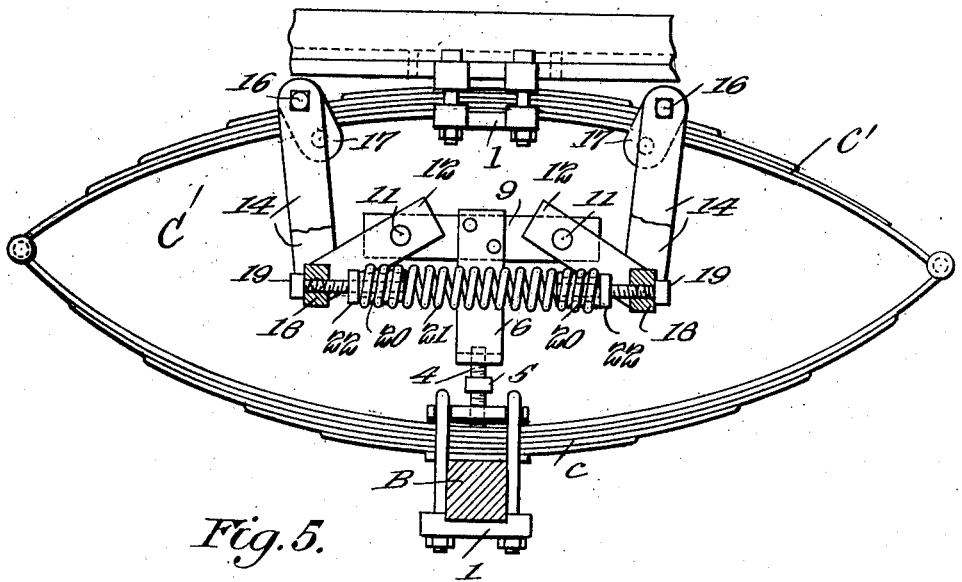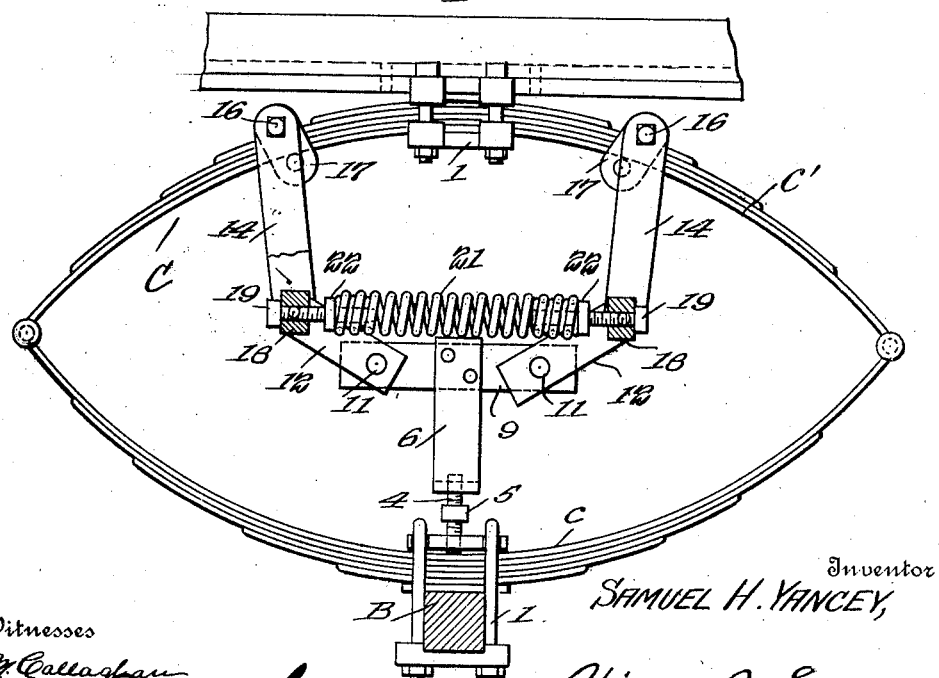

UNITED STATES PATENT OFFICE.

SAMUEL H. YANCEY, OF SOUTH BEND, INDIANA.

SHOCK-ABSORBER.

1,058,834.  Specification of Letters Patent.  Patented Apr. 15, 1913.

Application filed February 16, 1912. Serial No. 678,012.

*To all whom it may concern:*

Be it known that I, SAMUEL H. YANCEY, a citizen of the United States of America, residing at South Bend, in the county of St. Joseph and State of Indiana, have invented new and useful Improvements in Shock-Absorbers, of which the following is a specification.

My present invention relates to certain novel and useful improvements in shock absorbers and has particular application to a device of this type designed especially for use in connection with automobiles and other vehicles.

In carrying out this invention, it is my purpose to provide a compact, simple and efficient form of shock absorber which is adapted to be interposed between the two members of the vehicle spring in such a manner as to absorb and cushion the shocks, jars and jolts to which the vehicle is subjected when traveling over rough roadways.

Furthermore, I aim to provide a shock absorber, embodying in its construction means coöperating with other parts of the shock absorber and designed to lie normally in the center line between the truck or axle and body of the vehicle and adapted to be carried to one side or the other of such center line so that should the vehicle strike any inequalities in the roadway, such as a hill or depression, the means may act to cushion the movement of the body relatively to the truck and retard the rebound of such body.

I also aim to provide a simple shock absorber which may be applied to any ordinary vehicle and which may be manufactured and marketed at a low cost.

With the above-recited objects in view, the invention and others of a similar nature, the invention consists in the construction, combination and arrangement of parts hereinafter set forth in and falling within the scope of the appended claims.

In the accompanying drawings wherein has been illustrated one embodiment of my invention; Figure 1 is a view in side elevation of an elliptical spring provided with my invention, a portion of the vehicle body and axle being shown in side view. Fig. 2 is a top plan view of the device shown in Fig. 1. Fig. 3 is an end view. Fig. 4 is a vertical longitudinal sectional view, taken through the shock absorber and showing the parts in position when the two members of the elliptical spring are pressed toward each other. Fig. 5 is a similar view, showing the location of the parts when the two members of the spring are forced apart. Fig. 6 is a view, partly in side elevation and partly in section of a modified form of the device.

Similar reference characters designate like parts throughout the several views.

Referring now to the accompanying drawings in detail, the letter A indicates a portion of the body of a vehicle while B designates a portion of the truck or axle thereof. An elliptical spring C of any well known or preferred construction and design is fastened to the body of the vehicle and the axle thereof and between the same through the medium of the usual clips 1, 1, the lower member of the spring being indicated by the letter C while the upper member thereof is designated by the letter C'. Extending outward from the lower clip 1 and suitably fastened thereto is a metallic plate 2 having a threaded bore 3 for the reception of an adjustable screw shank 4, the latter being operated by a thumb nut 5 formed centrally thereon. Threaded onto the upper end of this screw shank and rigid therewith is a yoke member 6, the latter having at its end 7 a threaded bore for the reception of the proximate end of the shank aforesaid. Thus, it will be seen that this yoke, which, in the present instance, is approximately U-shaped in form, is rigidly connected through the means just described with the clip on the axle.

The numeral 8 indicates the arms of the yoke and carried by each arm is a bar 9, extending at right angles to its respective supporting arm, each of said bars being fastened by means of rivets or bolts 10. The two bars 9 extend longitudinally of the spring C and in parallelism therewith and with each other and are arranged at approximately the center of such spring and consequently centrally of the body and truck or axle of the vehicle. At each end of each arm is connected through the medium of a pivot 11, a link 12, there being four of these links, and at its outer end each link in turn is pivotally connected through the medium of a pivot pin 13 with upwardly extending arms 14. Each pair of arms 14 converge or meet at their upper ends, as at 15, and are connected through the medium of bolts 16 with a clip 17 disposed upon the opposite sides of the vertical center line of the spring and by means of which such arms are fastened to the upper member C' of such spring.

Interposed between the outer proximate ends of each pair of arms 12 is a boxing 18 having a bore therein through which extends a bolt 19, the shank 20 of each bolt projecting inwardly toward the supporting yoke. In accordance with the present invention, means is provided and designed to act in conjunction with the parts of the shock absorbing device just described to cushion the movement of the vehicle body relatively to the truck and to retard the rebound of such body. This means is arranged on a normal center between the vehicle body and the truck thereof and is adapted to be carried to one side or the other of such center to accomplish the ends aforesaid, and in the present instance consists of a powerful helical contractile spring 21 arranged in parallelism with the bars 9 and between the same, the ends of said spring fitting over the ends of the shanks 20 of the bolts 19, said shanks being provided with collars 22 designed to receive the opposing ends of the spring 21.

The construction above described will be readily apparent from an examination of Figs. 1, 2 and 3, and the operation may be briefly stated as follows: Should the vehicle in travel strike a rut, so that the wheels drop into the depression, the first tendency of the members of the vehicle spring will be to separate, and the coiled shock absorbing spring then takes effect as soon as the links are off center and holds upon the upper member of the spring, but as the coiled spring is not strong enough to hold the links off center the upper vehicle spring member is allowed to come down gradually, slowly and easily, thereby cushioning the jolt. On the contrary, should the wheels strike an elevation such as a hump or other small obstruction, the two members of the vehicle spring are compressed and the tendency of the coiled spring is to hold them compressed, but as the coiled spring is relatively weak, the members of the vehicle spring return to normal position against the action of the coiled spring easily and slowly, thereby avoiding shocks or jars.

In Fig. 6, I have shown a slightly modified form of construction, in this case employing a pair of arms 23, 23 which are pivotally connected as at 24 to the upper member of the elliptical spring and to one side of the center thereof, while a similar pair of arms 25, 25 are pivotally connected as at 26 to the lower member of the spring and on the opposite side of the center from the arms 23. Extending between the free ends of the arms 23 and 25 and at the longitudinal center of the elliptical spring are bars 27, pivoted as at 28, to the arms 25, the end portions 29 of said bars 27 permitting the arms 23 to slide therebetween when the bars or links 27 are moved about their pivot 28. The numeral 30 indicates a rod having one end 31 loosely connected to the pivot 28, and its opposite end adjustably threaded as at 32 into a supporting arm 33 rigidly connected as at 34 to the lower member of the spring. A compression spring designated at 35 is interposed about the end of the rod 30 between the rigid arm 33 and the adjacent ends of the bars 27. The operation of the modified form of device is substantially the same as that shown in the other figures and above described, and such operation may be briefly described as follows: When the lower member of the elliptical spring moves upwardly, incident to the vehicle striking a hump in the roadway, the links 27 are thrown at an angle and the spring 35 acts to pull the arms 23 and 25 toward each other with the effect to hold down on the upper member of the elliptical spring, thus permitting the members of the vehicle spring to assume their normal positions without jolt or jar. On the contrary, when the vehicle in its path of travel meets a depression in the roadway, the members of the elliptical spring separate and in so doing cause the arms 23 and 25 to move toward each other, the spring 35 acting to hold the arms in this position and so prevent the members of the elliptical spring coming together or assuming their normal position suddenly.

It will be noted that I have provided an exceedingly simple, compact, convenient and efficient form of shock absorber which may be employed in connection with any desired form of vehicle, for the purpose of relieving the shocks or jars incident to the travel of the vehicle.

While I have herein shown and described one particular form of my invention, by way of illustration, I desire it to be understood that I do not confine myself to all the precise details of construction herein delineated, as modification and variation may be made without departing from the spirit of the invention or exceeding the scope of the appended claims.

I claim:

1. The combination with the truck and body of a vehicle and a vehicle spring interposed between said truck and body, of a shock absorber disposed centrally of the spring and including a spring arranged on a normal center and adapted to be carried to one side or the other of said center by the first spring and acting with said first spring in the initial movement thereof and against the same on the rebound.

2. The combination with a vehicle including the body and axle thereof, of a spring comprising an upper member and a lower member connected to the body and axle, respectively, a support extending from the lower member of the spring and comprising a yoke having parallel arms, a plurality of bars carried by the yoke arms at right angles thereto, link members pivotally connected to said bars, connections between said link members and the upper member of the vehicle spring, and a coiled spring for absorbing the shock when the links have been drawn off center.

3. The combination with a vehicle including the body and axle thereof, of a spring comprising an upper member and a lower member connected to the body and axle respectively, a support extending from the lower member of the spring and comprising a yoke having parallel arms, link members pivotally connected with the yoke, connections between said link members and the upper member of the vehicle spring, and a coiled spring for absorbing the shock when the links have been drawn off center.

In testimony whereof I affix my signature in presence of two witnesses.

SAMUEL H. YANCEY.

Witnesses:
  HENRY C. MORRISEY,
  JOHN PLANT.